US011148599B2

(12) United States Patent
Salvia, III

(10) Patent No.: US 11,148,599 B2
(45) Date of Patent: Oct. 19, 2021

(54) CUP HOLDERS WITHIN CONSOLE ASSEMBLIES FOR VEHICLES

(71) Applicant: Toyota Motor Engineering & Manufacturing North America, Inc., Plano, TX (US)

(72) Inventor: John J. Salvia, III, Ann Arbor, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 16 days.

(21) Appl. No.: 16/600,947

(22) Filed: Oct. 14, 2019

(65) Prior Publication Data
US 2021/0107409 A1 Apr. 15, 2021

(51) Int. Cl.
B60R 7/04 (2006.01)
B60R 11/00 (2006.01)
B60N 3/10 (2006.01)

(52) U.S. Cl.
CPC ............... B60R 7/04 (2013.01); B60N 3/10 (2013.01); B60R 11/00 (2013.01); B60R 2011/0007 (2013.01)

(58) Field of Classification Search
CPC ... B60R 7/04; B60R 11/00; B60R 2011/0007; B60N 3/10
USPC ......................................................... 224/275
See application file for complete search history.

(56) References Cited

U.S. PATENT DOCUMENTS

| 4,848,627 A * | 7/1989 | Maeda | B60R 7/04 224/275 |
| 5,996,866 A * | 12/1999 | Susko | B60R 11/0241 224/281 |
| 6,059,243 A * | 5/2000 | Hikage | B60N 3/102 248/311.2 |
| 6,929,304 B1 * | 8/2005 | Dry | A47C 7/72 224/539 |

(Continued)

FOREIGN PATENT DOCUMENTS

DE 102012221398 B4 3/2016
JP 2002316572 A 10/2002

(Continued)

OTHER PUBLICATIONS

"MKIV Center Console Upgrades", Jul. 19, 2019, URL: https://www.ecstuning.com/News/MKIV_Center_Console_Front_CupHolders/.

Primary Examiner — Peter N Helvey
(74) Attorney, Agent, or Firm — Dinsmore & Shohl LLP

(57) ABSTRACT

Embodiments described herein relate to a center console assembly that includes a housing having a support surface and a receptacle recessed with respect to the support surface, a lid and a retaining mechanism. The lid includes an exterior surface, an opposite interior surface, and an opening extending between the exterior surface and the interior surface is coupled to the housing for movement between a closed position and a raised position. In the closed position, the interior surface faces the support surface of the housing and access to the receptacle is permitted through the opening of the lid. The retainer mechanism is coupled to the lid. The retainer mechanism is configured to retain an object between the support surface and the retainer mechanism when the lid is in the raised position.

13 Claims, 3 Drawing Sheets

(56) References Cited

U.S. PATENT DOCUMENTS

| | | | | |
|---|---|---|---|---|
| 6,942,267 | B1* | 9/2005 | Sturt | B60N 3/102 248/311.2 |
| 7,322,500 | B2* | 1/2008 | Maierholzner | B60N 3/102 15/236.02 |
| 8,276,964 | B2* | 10/2012 | Werner | B60N 3/105 296/24.34 |
| 8,714,613 | B1* | 5/2014 | Gillis | B60R 7/04 296/24.34 |
| 9,469,253 | B2* | 10/2016 | Brunard | B60R 11/02 |
| 9,925,898 | B2* | 3/2018 | Shin | B60N 2/793 |
| 10,308,192 | B2* | 6/2019 | Gonzalez | B60R 11/02 |
| 10,328,834 | B2 | 6/2019 | Kelat | |
| 10,343,600 | B2 | 7/2019 | Verwys et al. | |
| 10,377,319 | B2* | 8/2019 | Muiter | B60R 11/0241 |
| 10,793,082 | B2* | 10/2020 | Harris | B60K 37/04 |
| 10,793,083 | B1* | 10/2020 | Johns | B60R 11/0241 |
| 2012/0061983 | A1* | 3/2012 | Seiller | B60R 11/00 296/24.34 |
| 2012/0091948 | A1* | 4/2012 | Shinde | B60R 7/04 320/108 |
| 2013/0294105 | A1 | 11/2013 | Reuschel | |
| 2018/0345874 | A1* | 12/2018 | Thain | B60R 11/0258 |
| 2019/0100155 | A1* | 4/2019 | Muiter | B60R 11/0241 |
| 2019/0126804 | A1 | 5/2019 | Shin et al. | |
| 2019/0152401 | A1 | 5/2019 | Gargano et al. | |
| 2019/0315287 | A1* | 10/2019 | Bober | B60N 3/10 |
| 2020/0130602 | A1* | 4/2020 | Han | B60R 11/02 |

FOREIGN PATENT DOCUMENTS

| | | |
|---|---|---|
| JP | 2002331862 A | 11/2002 |
| JP | 2005125826 A | 5/2005 |
| JP | 2009006954 A | 1/2009 |
| JP | 5223709 B2 | 6/2013 |

* cited by examiner

CUP HOLDERS WITHIN CONSOLE ASSEMBLIES FOR VEHICLES

TECHNICAL FIELD

The present specification generally relates to a cup holder for console assemblies of vehicles and, more specifically, to cup holders having a lid that is configured to retain a personal electronic device.

BACKGROUND

Passenger compartments of vehicles may be equipped with console assemblies having cup holders located between a driver's seat and a front passenger's seat. The cup holders often include a pair of openings configured to receive a bottom portion of a cup. Increasingly, if a cup is not present in the opening, users utilize the opening of the cup holder as a storage area for objects, such as keys, wallets, personal electronic devices, and the like. Once the cup is positioned within the opening, the cup holder may no longer be used as a storage area.

Accordingly, there is a need for cup holders of console assemblies capable of holding a cup while also providing a storage area for objects, such as personal electronic devices.

SUMMARY

In accordance with one embodiment, a center console assembly that includes a housing having a support surface and a receptacle recessed with respect to the support surface, a lid, and a retaining mechanism is provided. The lid includes an exterior surface, an opposite interior surface, and an opening extending between the exterior surface and the interior surface is coupled to the housing for movement between a closed position and a raised position. In the closed position, the interior surface faces the support surface of the housing and access to the receptacle is permitted through the opening of the lid. The retainer mechanism is coupled to the lid. The retainer mechanism is configured to retain an object between the support surface and the retainer mechanism when the lid is in the raised position.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following description of the illustrative embodiments can be understood when read in conjunction with the following drawings, where like structure is indicated with like reference numerals and in which:

DETAILED DESCRIPTION

Figure 1:
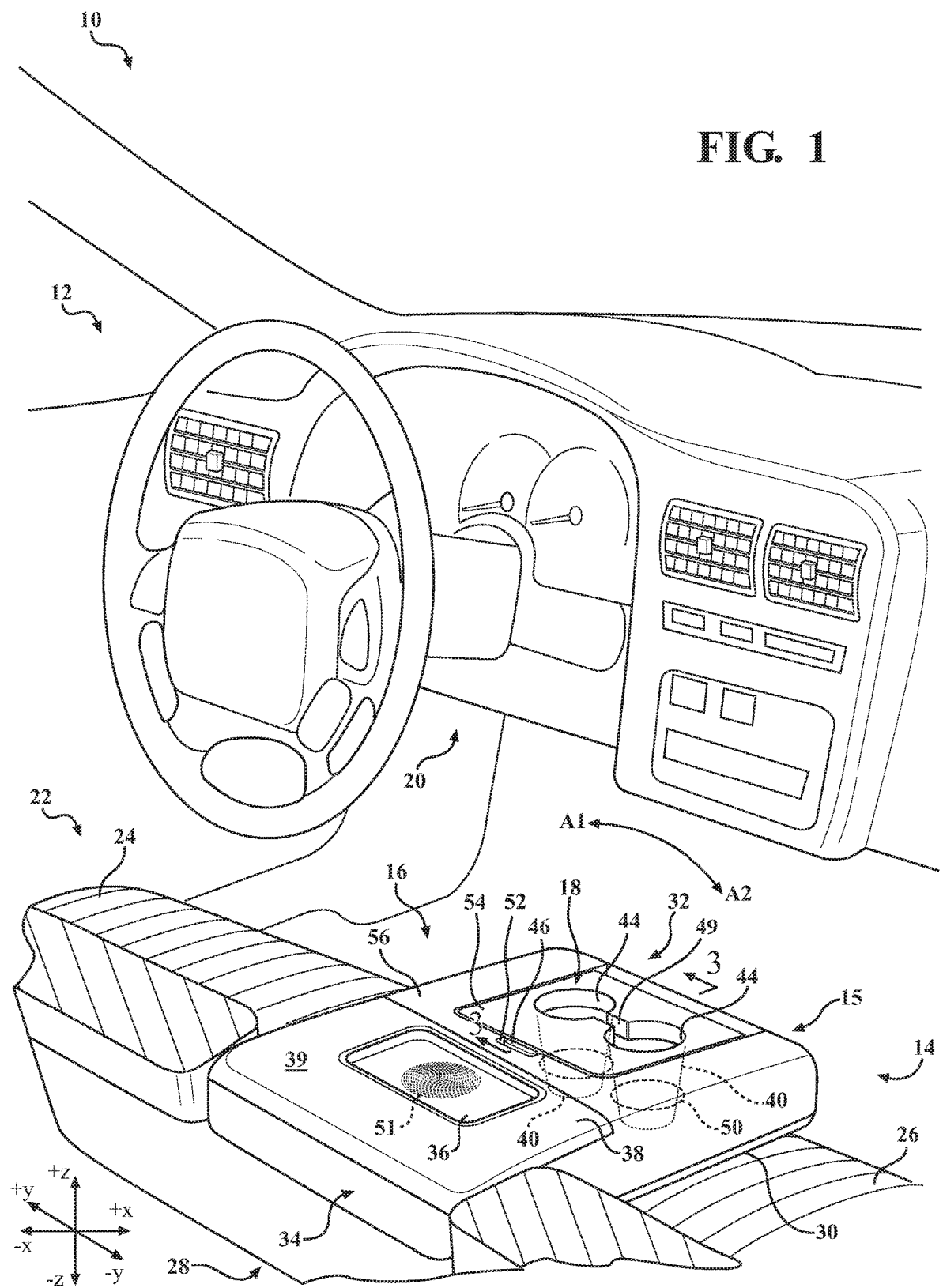
FIG. 1 schematically depicts a partial perspective view of a passenger compartment of a vehicle having a center console assembly having a cup holder portion with a lid in a closed position, according to one or more embodiments described and illustrated herein.

Vehicles according to the present specification include a passenger compartment having an instrument panel and a bench style seat, extending in a vehicle lateral direction that includes a driver seat portion and a front passenger seat portion. Between the driver seat portion and the passenger seat portion, and rearward of the instrument panel, is a combination center seat portion and center console assembly. The combination center seat portion and center console assembly is movable between a center seat position and a center console position. In the center seat position, the center console assembly faces rearward in a vehicle longitudinal direction, which allows the center seat portion to be used. In the center console position, the center console assembly extends rearward from the instrument panel in a vehicle longitudinal direction such that the center console assembly covers the center seat portion and allows the driver and/or passengers in the car access to the center console assembly.

The center console assembly includes a housing having a cup holder portion having a support surface and a lid. The cup holder portion includes a receptacle, formed as a cavity, positioned in the support surface. In some embodiments, the cup holder portion includes a pair of receptacles. The lid has an exterior surface and an interior surface and a cavity formed between the exterior surface and the interior surface. Further, the lid includes a proximate end, a distal end, and a retainer mechanism positioned at the distal end of the lid. The proximate end of the lid is hingedly attached to the support surface of the cup holder portion. The distal end of the lid includes a passage defined by a pair of sidewalls, a back wall, and a bottom wall. The passage is recessed with respect to the interior surface. The bottom wall includes an exterior surface, an opposite interior surface, and an aperture that extends between the exterior surface of the bottom wall and the interior surface of the bottom wall and is in communication with the cavity. The passage is configured to receive the retainer mechanism.

The lid further includes pair of openings. The pair of openings correspond to the pair receptacles. The lid is configured to move between a closed position and a raised position such that when the lid is in the closed position, access to the receptacles is permitted through the openings in the lid. The retainer mechanism is configured to retain an object, such as a personal electronic device, against the lid when the lid is in the raised position.

The retainer mechanism includes a hook and a biasing member. The hook includes a leg and an arm. The leg includes a first end and a second end. The arm extends outwardly from the second end leg. The first end of the leg includes a flange. The biasing member circumferentially surrounds the leg. The interior surface of the bottom wall of the passage is configured to engage with the biasing member on one end and the flange engages with the biasing member on the other end such that the biasing member is retained between the flange and the interior surface of the bottom wall of the passage. The arm is configured to contact the object when the lid is in the raised position. The aperture of lid allows the hook of the retainer mechanism to move between at least an extended position and a retracted position. That is, the hook may move in a vehicle vertical direction with respect to the cavity such that biasing member is in an unbiased state when the hook is in the retracted position and is in a biased state in the extended position to retain the object between the arm and the support surface when the hook is in the extended position.

In some embodiments, a beverage temperature control unit configured to heat or cool the object positioned within the pair of cup holders is positioned within the housing and may be positioned near the cup holder portion. Further, in some embodiments, a wireless charging unit may be positioned within the cavity. The wireless charging unit is configured to charge the personal electronic device when the personal electronic device is positioned within the cavity.

Various embodiments of the center console assembly for the passenger compartment of the vehicle will be described in more detail herein.

It should be appreciated that the center console assembly is not limited to the center seat portion and may be provided at any suitable position within a vehicle, such as between a pair of front row seats, a pair of second or third row rear seats, and the like. While the embodiments described herein are described in reference to a center console assembly having a cup holder portion and a cavity used as a personal electronic device charging area, the embodiments are not limited thereto. For example, in some embodiments, the center console assembly may further include a storage area, which may include, without limitation, alternative vehicle accessories such as ashtrays, electronic components, HVAC, and/or audio component controls, and the like.

In some embodiments, the center console assembly is fixedly secured to the center seat portion. However, the embodiments are not limited thereto. For example, in some embodiments, the center console assembly may be releasably attached to the center seat portion for movement between console assemblies positioned between pairs of first row seats, second row seats, and third row seats of a vehicle.

As used herein, the term "vehicle longitudinal direction" refers to the forward-rearward direction of the vehicle (i.e., in the +/− vehicle Y direction depicted in FIG. 1). The term "vehicle lateral direction" refers to the cross-vehicle direction (i.e., in the +/− vehicle X direction depicted in FIG. 1), and is transverse to the vehicle longitudinal direction. The term "vehicle vertical direction" refers to the upward-downward direction of the vehicle (i.e., in the +/− vehicle Z-direction depicted in FIG. 1). As used herein, "below" and "downwardly" are defined as the negative Z direction of the coordinate axis shown in the drawings.

Figure 2:
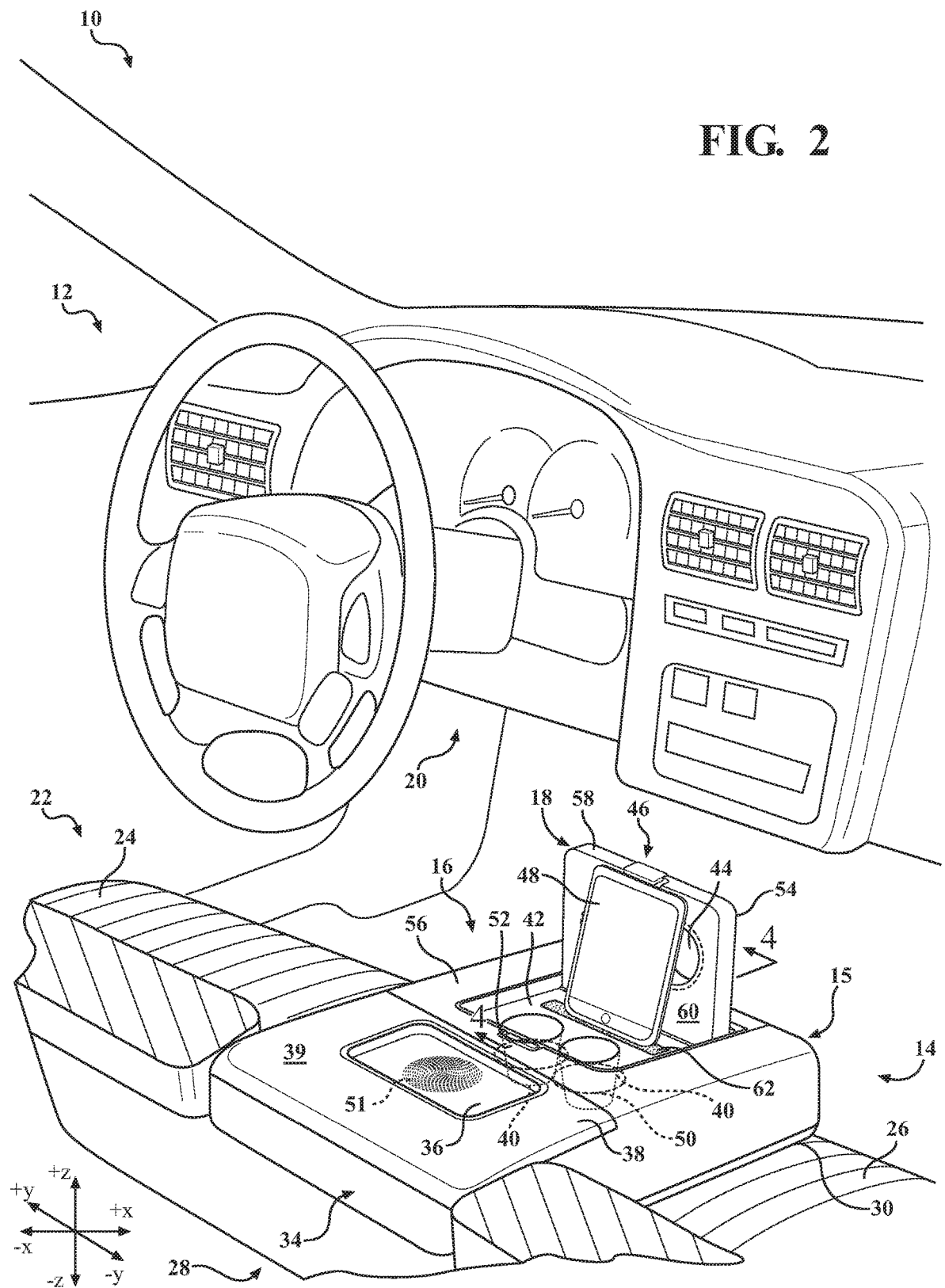
FIG. 2 schematically depicts a partial perspective view of the passenger compartment for the vehicle having the center console assembly of FIG. 1, with the lid in a raised position and an object retained by the lid, according to one or more embodiments described and illustrated herein.

Referring initially to FIGS. 1 and 2, a partial perspective view of a passenger compartment 12 of a vehicle 10 having a center console assembly 14 is depicted. The passenger compartment 12 includes a driver area and a passenger area. The center console assembly 14 includes a housing 15 that includes a cup holder portion 16 with a lid 18, and a retainer mechanism 46. The lid 18 is depicted in a closed position in FIG. 1 and the lid 18 is depicted in a raised position in FIG. 2.

An instrument panel 20 is provided within the passenger compartment 12. The instrument panel 20 generally extends in the vehicle lateral direction and includes, without limitation, an instrument cluster, a radio, and a climate control cluster including a plurality of individual vents. In some embodiments, the passenger compartment 12 includes a bench seat 22 that includes a driver seat portion 24, a front passenger seat portion 26, and a combination center seat portion and center console assembly 28. In some embodiments, the combination center seat portion and center console assembly 28 includes both a center seat portion 30 and the center console assembly 14, as discussed in greater detail herein. Located adjacent the driver seat portion 24 are the controls to the vehicle 10 such as, without limitation, a steering wheel, a gas pedal, and a brake pedal. It should be appreciated that the passenger compartment 12 may include a plurality of passenger seats rearward of the front passenger seat portion 26 in a vehicle longitudinal direction.

Generally, the combination center seat portion and center console assembly 28 is movable between a center seat position, designated as A1 in FIG. 1, and a center console position, designated as A2 in FIG. 1 and illustrated in FIG. 1. It should be appreciated that in the center seat position A1, the center console assembly 14 faces rearward, towards the rear of the vehicle, which allows the center seat portion 30 to be used. In the center console position A2, the center console assembly 14 extends rearward from the instrument panel 20 in a vehicle longitudinal direction such that the center console assembly 14 covers the center seat portion 30 and allows the driver and/or passengers in the car access to the center console assembly 14.

In some embodiments, the center console assembly 14 generally extends in the vehicle lateral direction an equal distance outwardly from the vehicle centerline, limited in width by the distance of the center seat portion 30. In other embodiments, the center console assembly 14 generally extends in the vehicle lateral direction at an unequal distance outwardly from the vehicle centerline based on the configuration of the bench seat configuration (i.e., difference is size of the driver seat portion 24, the front passenger seat portion 26 and the like).

Still referring to FIG. 1, the center console assembly 14 includes a forward portion 32 and a rearward portion 34, the forward portion 32 being closer to the instrument panel 20 than the rearward portion 34. Disposed within the forward portion 32 of the center console assembly 14 is the cup holder portion 16 with the lid 18. Disposed within the rearward portion 34 of the center console assembly 14 is a cavity 36 and a storage compartment 38. In some embodiments, the cavity 36 is positioned in a cover 39 of the storage compartment 38. In some embodiments, the cover 39 is moveable between an open position and a closed position, as shown in FIGS. 1 and 2. In the open position, access to the storage compartment 38 is permitted. Further, in some embodiments, the storage compartment 38 may be integrated with the center console assembly 14. In other embodiments, the storage compartment 38 may be separated from the center console assembly 14. In some embodiments, the cover 39 may be an armrest for the driver, the front passenger, or both. As such, in these embodiments, the cover 39 may be a soft touch armrest.

Figure 3:
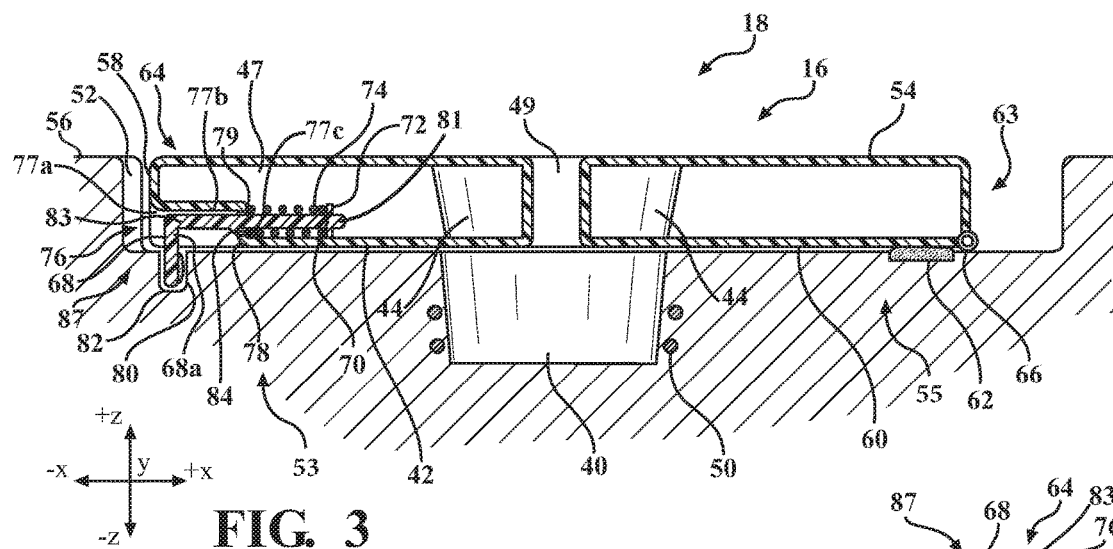
FIG. 3 schematically depicts a partial cross-sectional view of the console assembly of FIG. 1 taken along lines 3-3 of FIG. 1, according to one or more embodiments described and illustrated herein.
Figure 4:
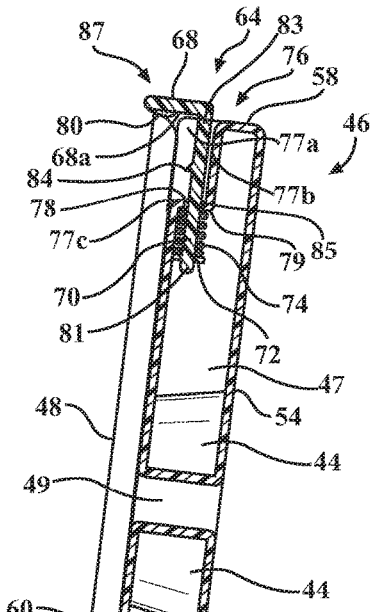
FIG. 4 schematically depicts a partial cross-sectional view of the console assembly of FIG. 2 taken along lines 4-4 of FIG. 2, according to one or more embodiments described and illustrated herein.
Figure 4:
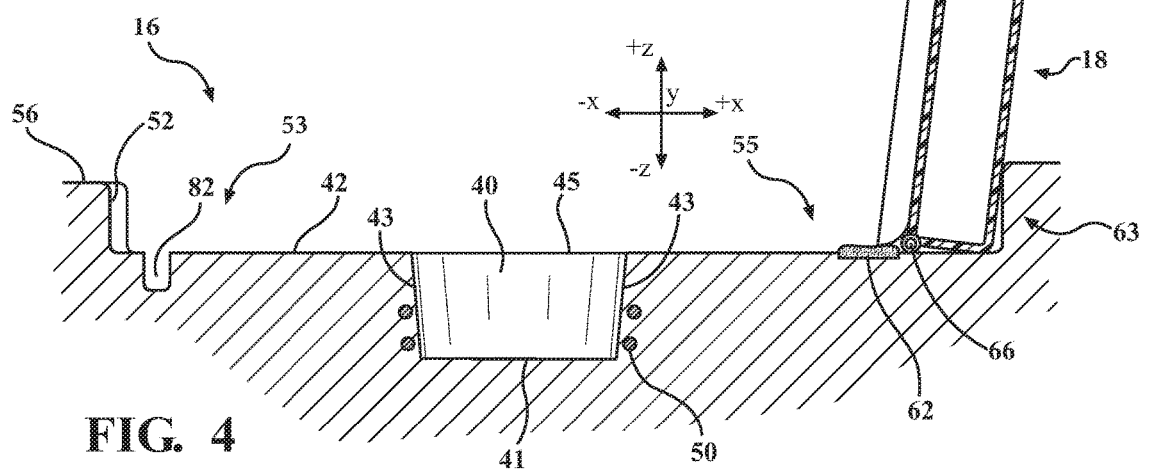

Referring to FIGS. 2, 3, and 4, the cup holder portion 16 includes cavities or receptacles 40 that are configured as cup holders or storage portions. The receptacles 40 are recessed with respect to a support surface 42 of the housing 15 downwardly in the vehicle vertical direction (i.e., in the +/−Z direction). Referring to FIG. 4, the receptacles 40 include bottom wall 41, and at least one sidewall 43 that define receptacle openings 45 in the support surface 42 of the housing 15. It is appreciated that although a pair of receptacles 40 are illustrated, the housing 15 is not limited to the pair of receptacles 40 and that the housing 15 may include only one receptacle 40 or a plurality of receptacles 40. The support surface 42 includes a first end 53 and an opposite second end 55 that are spaced apart in the vehicle longitudinal direction. The pair of receptacles 40 are positioned between the first end 53 and the second end 55.

The lid 18 includes an exterior surface 54, an opposite interior surface 60, and a pair of openings 44 extend between the exterior surface 54 and the interior surface 60. The pair of openings 44 are dimensioned to correspond to the pair of receptacles 40. Specifically, a diameter of the openings 44 provided on the interior surface 60 corresponds to a diameter of the receptacle openings 45 formed in the support surface 42. Further, in some embodiments, the pair of openings 44 are connected by a slot 49 that extends in the vehicle lateral direction. It is appreciated that although the slot 49 is illustrated, the pair of openings 44 is not limited to being connected by the slot 49 and may not be connected or the slot 49 may have other shapes such as a square, a rectangle, an oval, and the like. As discussed in greater detail below, a cavity 47 is formed between the exterior surface 54 and the interior surface 60 of the lid 18.

The lid 18 further includes a proximate end 63 and a distal end 64. The proximate end 63 of the lid 18 is hingedly attached adjacent to the second end 55 of the support surface 42, via a hinge 66. The distal end 64 includes a distal surface 58. The distal end 64 includes a passage 76 defined by a pair of sidewalls 77a, a rear wall 77b and a bottom wall 77c. The passage 76 is recessed with respect to the interior surface 60 of the lid 18. The bottom wall 77c includes an exterior surface 78, an opposite interior surface 79, and an aperture 85 that extends between the exterior surface 78 of the bottom wall 77c and the interior surface 79 of the bottom wall 77c. The aperture 85 is in communication with the cavity 47 formed between the interior surface 60 and the exterior surface 54 of the lid 18. The passage 76 is configured to receive the retainer mechanism 46. The retainer mechanism 46 is positioned, at last partially, within the passage 76 of the distal end 64 of the lid 18 such that components of the retainer mechanism 46 may extend and retract with reference to the distal surface 58 of the lid 18, as discussed in greater detail herein.

In operation, the lid 18 is configured to move between a closed position, as depicted in FIG. 1, and a raised position, as depicted in FIG. 2, such that when the lid 18 is in the closed position, an object, such as a cup, a bottle, and the like, may pass through the openings 44 in the lid 18 and enter the receptacles 40 that correspond to the openings 44. In some embodiments, when the lid 18 is in the closed positon, the exterior surface 54 of the lid 18 is flush with an exterior surface 56 of the housing 15.

It should be appreciated that when the lid 18 is in the raised position, the support surface 42 of the cup holder portion 16 is exposed. As discussed in greater detail below, the retainer mechanism 46 is configured to retain an object 48 between the support surface 42 and the retainer mechanism 46 when the lid 18 is in the raised position. As such, the object 48 is positioned between the retainer mechanism 46 and the support surface 42 to retain the object 48 while still providing access to the pair of receptacles 40. Further, the support surface 42 of the cup holder portion 16 is configured with an engagement surface 62 configured to make contact with the object 48 when the object 48 is retained with the retainer mechanism 46, as discussed in greater detail herein.

It should be appreciated that the object 48 may be personal electronic device such as a mobile phone, a tablet, a laptop, and the like, or may be a book. In some embodiments, the engagement surface 62 is a friction surface, such as a rubber material, an anti-slip surface, and the like. The engagement surface 62 extends in the vehicle lateral direction (i.e., in the +/−Y direction) across the support surface 42 of the cup holder portion 16. As such, the engagement surface 62 is configured to assist in maintaining the object 48 retained in the retainer mechanism 46 while the vehicle 10 and the center console assembly 14 experiences motion, vibration, and the like.

As best seen in FIGS. 3-4, the retainer mechanism 46 includes a hook 87 having an arm 68, a leg 70 having a flange 72 and a biasing member 74 that circumferentially surrounds the leg 70. The biasing member 74 may be a coil spring, a resilient member such as rubber, and the like. The leg 70 includes a first end 81 and an opposite second end 83. The arm 68 extends outwardly from the second end 83 of the leg 70 such that the hook 87 may have a generally "L" shape. The flange 72 extends outwardly from the first end 81 of the leg 70. The biasing member 74 is positioned between the first end 81 and the second end 83 of the leg 70. In some embodiments, the biasing member 74 is retained between the flange 72 of the leg 70 and the interior surface 79 of the bottom wall 77c of the passage 76. That is, the biasing member 74, at least a portion of the first end 81 of the leg 70 and the flange 72 are positioned within the cavity 47. The arm 68 is configured to extend beyond the interior surface 60 of the lid 18 such that the arm 68 may apply a compressive force to the object 48 retaining the object by the retainer mechanism 46, as described in greater detail herein. In some embodiments, a contact surface 68a of the arm 68 is in contact with the object 48 when the object 48 is retained by the retainer mechanism 46. The leg 70 may further include a stopper 84 positioned between the second end 83 and the first end 81. The stopper 84 may be an outwardly extending tab configured to engage with the exterior surface 78 of the bottom wall 77c of the passage 76.

The aperture 85 of the passage 76 permits the leg 70 of the retainer mechanism 46 to move between a retracted position, as best shown in FIG. 3, and an extended position, as best shown in FIG. 4. That is, the arm 68 and the leg 70 may move together such that the object 48 may be held by at least the contact surface 68a of the arm 68. The leg 70 of the hook 87 is slidable with respect to the aperture 85 to move between the retracted position (FIG. 3) and the extended position (FIG. 4). As such, when the hook 87 is in the retracted position (FIG. 3), more of a portion of the leg 70 is within the cavity 47 and, when the hook 87 is in the extended position (FIG. 4), less of a portion of the leg 70 is in the cavity 47. That is, a distance between the arm 68 and the bottom wall 77c in the retracted position (FIG. 3) is smaller than a distance between the arm 68 and the bottom wall 77c in the extended position (FIG. 4). Further, in the retracted position of the hook 87, as shown in FIG. 3, the biasing member 74 is in an uncompressed state. In the extended position of the hook 87, as shown in FIG. 4, the biasing member 74 is in a compressed state, between the flange 72 of the leg 70 and the interior surface 79 of the bottom wall 77c of the passage 76. That is, the hook 87 is moveable between a retracted position (FIG. 3) and an extended position (FIG. 4), and the biasing member 74 biases the hook 87 towards the retracted position (FIG. 3).

As such, when the hook 87 is in the extended position, the biasing member 74 is in the compressed state such that the contact surface 68a of the arm 68 may exert a force on the object 48 such that the object 48 is held against the engagement surface 62 of the support surface 42 of the cup holder portion 16. Further, it should be appreciated that the stopper 84 may be positioned a predetermined distance from the exterior surface 78 of the bottom wall 77c such that the retracted position of the 85 is set by the stopper 84 contacting the exterior surface 78. That is, the stopper 84 engages with the exterior surface 78 of the bottom wall 77c when the hook 87 is in the retract position. In some embodiments, the retracted position positions the arm 68 below the distal surface 58 of the lid 18 and, in other embodiments, the extended position positions the arm 68 beyond the distal surface 58 of the lid 18 when the lid 18 is in the raised position. It is appreciated that the hook 87 may move into a plurality of positions, or a plurality of intermediate positions, between the retracted position and the extended position. It is appreciated that in some of the intermediate positions, the arm 68 may be positioned below the distal surface 58 of the lid 18 and, in other intermediate positions, the arm 68 may extend beyond the distal surface 58 of the lid 18. In some embodiments, the plurality of intermediate positions may be determined by the size and/or shape of the object in contact with the arm 68. In other embodiments, the plurality of intermediate positions may be determined by the size and/or shape of the biasing member 74, the leg 70, and the like.

Further, in some embodiments, the contact surface 68a of the arm 68 includes an engagement surface 80 configured to make contact with the object 48 when the object 48 is retained by the contact surface 68a of the arm 68. In some embodiments, the engagement surface 80 is a friction surface, such as rubber, an anti-slip surface, and the like. As such, the engagement surface 80 is configured to assist in maintaining the object 48 retained by the contact surface 68a of the arm 68 while the vehicle 10, and/or the center console assembly 14 experience motion, vibration, and the like.

In some embodiments, the arm 68 of the retainer mechanism 46 is configured to retract into the passage 76 such that arm 68 is positioned below the distal surface 58 of the lid 18. That is, when the object 48 is not retained by the retainer mechanism 46, the arm 68 may rest at a position that is below the distal surface 58 of the lid 18. It should be appreciated that the lid 18 may be either in the raised or in the closed position. The support surface 42 of the cup holder portion 16 may include a recess 82. The recess 82 is disposed at the first end 53 of the support surface 42, opposite the hinge 66, such that when the lid 18 is in the closed position, the portion of the arm 68 of the retainer mechanism 46 that extends beyond the interior surface 60 of the lid 18 is positioned within the recess 82.

In some embodiments, the recess 82 is not needed as the arm 68 is a flap that is hingedly attached to the leg 70 such that when the lid 18 is in the closed position, the arm 68 is folded against the support surface 42 and when the lid 18 is in the raised position, the flap forming the arm 68 extends in the vehicle longitudinal direction (i.e., in the +/−X direction) to receive the object 48.

Referring back to FIGS. 1-2, the housing 15 further includes a notch 52. In some embodiments, the notch 52 is configured to receive at least a portion of the retainer mechanism 46 when the lid 18 is in the closed position, as depicted in FIG. 1. In other embodiments, the notch 52 provides a user the space required to make contact with the distal surface 58 of the lid 18 such that the user may raise the lid 18 from the closed position. It should be appreciated that the exterior surface 54 of the lid 18, when in the closed position, is flush with the exterior surface 56 of the housing 15. As such, the user may not be able to grip and/or raise the lid 18 from other surfaces, such as the peripheral edges of the lid 18. Further, the notch 52 and the support surface 42 of the cup holder portion 16 extend a depth in the vehicle vertical direction (i.e., in the +/−X direction) at least the same distance as the thickness of the lid 18. As such, there is enough clearance for an interior surface 60 of the lid 18 to abut the support surface 42 of the cup holder portion 16 such that the exterior surface 54 of the lid 18 is flush with the exterior surface 56 of the housing 15 when the lid 18 is in the closed position.

Still referring to FIGS. 1 and 2, in some embodiments, a beverage temperature control unit 50 configured to heat or cool the object positioned within the pair of receptacles 40. The beverage temperature control unit 50 is positioned within the housing 15 and, in some embodiments, may be positioned within the cup holder portion 16. In other embodiments, the beverage temperature control unit 50 may be positioned anywhere within the housing 15 such that the beverage temperature control unit 50 may heat or cool the objects that are positioned within the pair of receptacles 40.

Further, in some embodiments, a wireless charging unit 51 may be positioned within the cavity 36. The wireless charging unit 51 is configured to charge the object 48 when the object 48 is positioned within the cavity 36. In some embodiments, the wireless charging unit 51 may be positioned within the cover 39 of the storage compartment 38. In other embodiments, the wireless charging unit 51 may be positioned anywhere within the housing 15 such that the wireless charging unit 51 may wireless charge the object 48 when the object 48 is positioned within the cavity 36.

The above described center console assemblies provide housing that includes a support surface and at least one receptacle and a lid. The lid is coupled to the housing and has at least one opening that corresponds to the at least one receptacle within the support surface. The lid further includes a retaining mechanism. The lid is configured to be movable from a closed position to a raised position such that when the lid is in the closed position, an object may pass through the at least one opening in the lid and enter the at least one receptacle. The retainer mechanism is configured to retain an object, such as personal electronic device or a book, against the lid when the lid is in the raised position.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A center console assembly comprising:
   a housing having a support surface and a receptacle recessed with respect to the support surface;
   a lid having an exterior surface, an opposite interior surface, and an opening extending between the exterior surface and the interior surface, the lid is coupled to the housing for movement between a closed position and a raised position, in the closed position the interior surface faces the support surface of the housing and access to the receptacle is permitted through the opening of the lid; and
   a retainer mechanism coupled to the lid, the retainer mechanism configured to retain an object between the support surface and the retainer mechanism when the lid is in the raised position.

2. The center console assembly of claim 1, wherein the retainer mechanism includes a hook and a biasing member, the hook is moveable between a retracted position and an extended position, and the biasing member biases the hook towards the retracted position.

3. The center console assembly of claim 2, wherein the hook includes a leg having a first end and an opposite second end, and an arm that extends outwardly from the second end of the leg, wherein the hook is configured to retain the object between the support surface and the arm when the hook is in the extended position and when the lid is in the raised position.

4. The center console assembly of claim 3, wherein the interior surface of the lid includes a passage recessed with respect to the interior surface, the passage defined by a bottom wall, a rear wall, and a pair of sidewalls, the bottom wall having an exterior surface, an opposite interior surface, and an aperture that extends between the exterior surface of the bottom wall and the interior surface of the bottom wall, wherein a portion of the leg between the first end and the second end extends through the aperture.

5. The center console assembly of claim 4, wherein the leg of the hook is slidable with respect to the aperture to move between the retracted position and the extended position, a distance between the arm and the bottom wall in the retracted position is smaller than a distance between the arm and the bottom wall in the extended position.

6. The center console assembly of claim 5, wherein the leg includes an outwardly extending flange adjacent the first end, the biasing member is positioned between the flange of the leg and the interior surface of the bottom wall.

7. The center console assembly of claim 6, wherein the biasing member is in a compressed state when the hook is in the extended position and the biasing member is in an uncompressed state when the hook is in the retracted position.

8. The center console assembly of claim 7, wherein the leg includes a stopper positioned between the second end and the first end, the stopper is configured to contact the exterior surface of the bottom wall when the hook is in the retracted position.

9. The center console assembly of claim 8, wherein the proximate end of the lid is coupled to the support surface by a hinge.

10. The center console assembly of claim 9, wherein the support surface includes a friction engagement surface positioned adjacent the proximate end of the lid, the friction engagement surface is configured to be in contact with the object.

11. The center console assembly of claim 10, wherein the support surface includes a notch recessed with respect to the support surface, the notch configured to receive a portion of the arm when the lid is in the closed position.

12. The center console assembly of claim 11, wherein the arm includes a friction engagement surface configured to be in contact with the object.

13. The center console assembly of claim 1, wherein the receptacle is entirely recessed with respect to the support surface.

\* \* \* \* \*